३,०४१,१९७
COATING SURFACES WITH ALUMINUM
Carl Berger, Detroit, Mich.
(18 Cooke Road, Lexington, Mass.)
No Drawing. Filed June 1, 1959, Ser. No. 817,060
11 Claims. (Cl. 117—47)

This invention relates to a method for coating surfaces with aluminum and more particularly to a method involving depositing upon a surface, an adherent aluminum film, said aluminum film being formed from an aluminum containing organic compound dissolved in a solvent, either liquid or solid.

Various systems have been used to put an aluminum surface on various metallic or non-metallic substrates. Cladding techniques are used wherein aluminum sheet is bonded to substrate by a cumulation of extensive surface treatment of the substrate plus a combination of heat and pressure. High operating pressures and temperatures are utilized thereby limiting the substrates that may be used and providing serious corrosion and operating problems.

The various well known vacuum techniques produce quite thin films and are subject to low production levels, batch production and severe size limitations.

The decomposition of aluminum compounds is recorded in the literature. Aluminum hydride has been decomposed into aluminum and hydrogen (Ber. 75B pages 20003–12, 1942) but because of the explosive and sensitive nature of this compound, the use of such a material for plating various substrates is unlikely. In addition, Davis (U.S. Patent 2,599,978) and Homer (U.S. Patent 2,824,828) have decomposed aluminum compounds in the gas phase. Other gas phase decompositions have also been described by Powell (Vapor Plating). Gas phase decompositions have never attained practical industrial usage since systems must be tightly sealed against atmospheric contamination, constant pressure conditions maintained and gas flow rates strictly controlled. Moreover, many problems exist in vaporizing decomposable materials and in almost all cases carrier gases must be provided to give direction to the flow of the decomposable gas. All additives to the gas stream, in order to modify metal films produced, must be volatile and flow rates strictly controlled. The substrate to be plated must be heated and prepared in the closed system which also leads to many limitations and engineering problems, some of which are insurmountable without resorting to expensive processes or equipment. Finally, many safety precautions must be taken with such systems.

The present invention provides a system where a heat decomposable aluminum compound in solution in a liquid or solid is put into contact with a heated substrate thereby causing the formation of aluminum on the substrate. The superiority of this technique manifests itself in the facts that the process can be safely performed in an open vessel if desired, the chemical and physical nature of the films produced can be simply altered by changing the concentration of the heat decomposable aluminum compound, the addition of modifying agents to the solvent, and the alteration of solution and substrate temperatures before deposition. The choice of the proper solvent allows the freshly plated sample and its virgin surface to be protected from contamination (e.g. paraffin wax). The above advantages and others to be described can not be attained by any other technique available for plating aluminum.

While a system in true solution is preferred, an emulsion or suspension of the heat decomposable compound in a solvent, or the solvent in the compound, can be used. Such emulsion or suspension systems are included within the scope of the present invention. Additives may be dissolved or suspended in the solvent to alter the chemical and physical characteristics of the deposited aluminum surface or to maintain emulsion stability.

It is also possible to use the liquid or solid material which is heat decomposable into aluminum without dissolving them or suspending them in a solvent. The use of the material in this manner does not lend itself to the purposeful alteration of the chemical and physical properties of the aluminum film deposited on various substrates. In addition, many safety precautions must be taken with this type of system.

An object of this invention is to provide a method for coating almost any type of surface with aluminum, with the only limitation being that the surface itself must be of such a nature that it will not decompose under the influence of the relatively low temperature required in carrying out this method. Thus, surfaces of objects made of metal, glass, suitably hardened clay, various heat resistant plastics etc., may all be coated with a thin coating of pure aluminum by this process.

Another object of this invention is to provide an inexpensive means for coating of aluminum by means of subjecting the surface to a bath containing a heat decomposable compound containing aluminum and by decomposing such a bath to cause aluminum to deposit upon the surface, thereby forming a continuous, solid coating thereon.

Another object of this invention is to provide an inexpensive means for coating any surface with a thin coating of aluminum by means of subjecting the surface to a liquid or solid solution formed of a heat decomposable compound containing aluminum, said compound being dissolved in the liquid solvent or a solid solvent.

Another object of this invention is to provide an inexpensive means for coating any surface with a thin coating of aluminum which can then be anodized by conventional procedures.

Another object of this invention is to provide an inexpensive means for coating any surface with a thin coating of aluminum which can be used as an intermediate coating for the deposition of metals by conventional means or the deposition of non-metals or plastics, where aluminum is a preferred substrate to improve adhesion.

These and other objects and advantages of this invention will become apparent upon reading the following description.

I have now found a process for the deposition in solvent medium of aluminum on a surface which comprises generally the contacting of an aluminum containing organic compound such as for example, an aluminum alkyl, capable of decomposing under heat to liberate aluminum, in a solvent for said compound with a surface or substrate, while maintaining at least a portion of said compound at a temperature of at least in its heat decomposition range.

My invention further includes a process for the deposition in solvent medium of aluminum on a surface which comprises the placing of an aluminum alkyl compound, that can be decomposed in the presence of heat, in a solvent for said compound; heating the resulting solution to a temperature slightly below the heat decomposition range of said compound; heating the said surface to a temperature above about the heat decomposition range of said compound; and contacting the said heated compound with said heated surface.

In addition, I have found a new aluminum composition formed on a surface by a method which comprises: contacting an aluminum containing organic compound, capable of decomposing under heat to liberate aluminum, in a solvent for said compound with said surface, while maintaining said compound at a temperature of at least in its heat decomposition range.

The production of aluminum films on various substrates is of much practical value. Various corrosion susceptible metals such as irons and steels may be coated with aluminum by this method in order to prevent rusting. Non-electricity conducting materials such as glass and ceramics may be made electrically conductive by depositing aluminum films on them by my process. Aluminum films deposited on various metals by my technique may serve as intermediate coatings upon which other metals such as chromium may be electrodeposited or deposited in any other conventional manner. Aluminum films may also be decomposed on glass vessels by my process to produce decorative effects since films of high gloss are produced on glass.

It is found that any aluminum containing organic compound, capable of decomposing under heat to liberate aluminum, which can be dissolved or suspended in a solvent medium, can be used to produce an aluminum film on given substrates. Due to the restrictions of cost, availability, safety, and the temperature to which the substrates may be heated, it is found that aluminum alkyls such as aluminum trimethyl, aluminum triethyl and aluminum tri-isobutyl are preferred compounds for use. All of these materials decompose into aluminum and organic residue upon reaching their ultimate decomposition temperature. In practice, it is found that the order of preference among the aluminum alkyls is aluminum tri-isobutyl, aluminum triethyl and aluminum trimethyl. This is the case since aluminum tri-isobutyl decomposes at a lower temperature than aluminum triethyl which decomposes at a lower temperature than aluminum trimethyl.

Generally operative are the higher members of the alkyl series, as well as the lower alkyl series, especially those members whose heat decomposition points or ranges are generally between about 170 and 500 degrees centigrade. Examples of such compounds are aluminum tri-isopentyl, aluminum tri-isooctyl, aluminum tri-isopropyl, aluminum tri-dodecyl and the like. Substituted aluminum alkyls, preferably wherein the substituting radical is a saturated aliphatic radical, are usually operative. Substituents tending to react with the newly deposited aluminum coating or film are to be generally avoided.

Although it is possible to use pure aluminum alkyls to deposit aluminum films, I have discovered that the use of a solvent medium is preferred because of its many advantages. The safety of a solvent system is far superior, for instance. Solutions of aluminum alkyls may be handled in the open without fear of fire and explosions. Corrosion and engineering problems are minimized and handling problems are alleviated. Without solvent, closed systems containing inert gases must be used and considerable caution exercised.

The use of the solvent system yields greater economy since the decomposition of aluminum alkyl, in excess of that needed to produce a film, is lessened since the aluminum alkyl is molecularly dispersed throughout the solvent which dissipates the heat evolving from the substrate to be plated.

Unexpectedly, I have found that the state of molecular aggregation of the aluminum alkyl differs from that found, either in the gas state or the solvent free liquids, when the said alkyl is dissolved or suspended in a solvent medium. This is caused by the interplay of the molecular attractive forces of the aluminum alkyl and the solvent. These forces will vary with concentration, temperature, the particular solvent, and the particular metal alkyl used. The net result of these factors is that the chemical and physical conditions under which aluminum will deposit on various substrates will and does differ from gas state decomposition or decomposition of the solvent free liquids. For instance, it has been found unexpectedly that the decomposition of aluminum tri-isobutyl starts at a lower temperature in a paraffin wax solvent than when it is decomposed in the solvent free state. For a fifty percent by volume solution of aluminum tri-isobutyl in paraffin wax, the difference is about 40–50 degrees centigrade.

Another advantage of the use of the solvent state is that the aluminum alkyls may be dissolved in hot solvents which solidify upon cooling (e.g. paraffin wax) thus providing a convenient handling form for soldering and other applications where a stable solid heat decomposable source of aluminum may be required.

In general, solid and liquid state solvents are useful, especially the hydrocarbons.

Materials which may be used as solvents are higher alkanes, aromatics, and paraffins, which are stable and boil at temperatures greater than the decomposition range of the aluminum organic compound to be decomposed. Typical of such solvents are n-dodecane, 1, 2, 3, 4 tetramethylbenzene, Tetralin, naphthalene, 1 - methyl naphthalene, diphenyl, anthracene, paraffin distillate, paraffin wax and petrolatum (Vaseline). Solvent mediums which may not be used are water, alcohols, primary and secondary amines, organic and inorganic acids. These latter fall in the class of solvents with active hydrogen atoms.

The use of various minor components in the solvent medium causes modification where desired, of the physical and chemical properties of the aluminum film deposited. Such agents are wetting agents (to promote adhesion), oxidizing and reducing compounds. Typical of these are calcium phenyl stearate, polydimethylsiloxane, lead soaps, $Na_2S_2O_3$, hydrogen peroxide (anhydrous), $KMnO_4$, $LiAlH_4$, $H_2$, $O_2$, peracetic acid, and others. These important modifications cannot be achieved in either gas state or solvent free liquid state deposition of aluminum.

Surfaces on which aluminum can be deposited successfully are copper, iron, steel, aluminum, as well as alloys of the preceding and other metals. In addition, films of aluminum can be deposited on glass, ceramics, and other inorganic substrates. Organic or inorganic plastics or resins, which may be heated without decomposing, to above the decomposition temperature of the aluminum alkyls, may also be utilized. Some phenolics, epoxy resins, and halogenated materials fall into this class.

The handling of solvent systems of the aluminum alkyls is similar to the handling of solvent free compounds except that the conditions are far less stringent and that the exclusion of air and water vapor is not as important.

The aluminum containing organic compound used is dissolved in the appropriate solvent and the substrate, heated in any conventional fashion, is brought into contact with the liquid and an aluminum film is formed on this substrate. The substrate is allowed to cool and is then rinsed with a cleaning solvent which will remove the residual aluminum alkyl and bath solvent. Such a solvent may be heptane or other lower alkanes such as pentane. If a solvent such as paraffin wax is used as a solvent, the plated substrate may be removed immediately since the cooling paraffin solidifies, thus protecting the newly plated surface from oxidation or other contamination.

One procedure typical of the "soldering stick approach" which may be used is to allow the plating bath to remain at room temperature and to heat the article to be plated sufficiently high, so that when it contacts the liquid or solid bath, it can raise enough of the surrounding aluminum alkyl to its decomposition temperature to produce a film of aluminum on the article. Preferably, the plating bath is raised to slightly below its decomposition temperature or range and the heated article is then submerged. This has the advantage of using lower temperatures for the article to be plated which can therefore prevent physical and chemical deterioration of said article and allow a greater range of articles to be used.

Besides the dipping technique which we have used, it is possible to spray the plating bath, using inert gas to maintain pressure, at a heated article and thus deposit aluminum on it. The plating bath temperature may be any temperature from ambient up to just below its decomposition point or range. Moreover, the plating bath may also be made to flow past an article or many articles heated to the proper temperature so that they may decompose the plating liquid flowing by. Finally, the aluminum alkyl, dissolved in a solid solvent such as paraffin wax, may be formed in stick form to be used to "solder" heated terminals or other connections. Heated paraffin wax solution may be caused to flow onto a surface, solidify, and then the surface may be heated, causing a deposit of aluminum to form thereon.

The temperature at which decomposition occurs for various solutions of the aluminum organic, e.g. aluminum alkyls, will vary with the solvent. I have found that the temperatures from about 170° C. through about 500° C. are operative. For aluminum tri-isobutyl solutions, the effective operating range of decomposition is about 175–225° C.; for aluminum triethyl about 260–310° C.; for aluminum trimethyl about 450–500° C. The solution in which these ranges were established is a fifty percent by volume solution of aluminum alkyl in paraffin wax. The most effective operating temperature in each case is around the middle of the range of temperatures. At the low end of the range decomposition occurs slowly if at all. At the high end of the range, decomposition occurs, either so rapidly that poor physical properties are obtained in the film, or the sample is so hot that decomposition occurs in the plating bath but not on the surface of the sample.

The time of deposition of the aluminum film on a given substrate is a matter of a fraction of a second to a few seconds and deposition continues until insufficient heat is available from the substrate to continue the decomposition. The higher the temperature differential between the substrate and the plating solution (presuming that the plating solution is near its decomposition point) the faster will the deposition occur. It is also clear that the thickness of the coat is a direct function of the time that the heated specimen is kept in contact with the plating solution, said specimen having enough heat to continue production of aluminum film on its surface.

Films of thicknesses from .0005 inch to .005 inch have been deposited on one immersion. By varying the time of immersion and by repeating immersions, thinner and thicker films can be produced. An analysis by spectrograph of typical aluminum films revealed the following analysis:

Al—One hundred percent
C—Trace
Si—Trace

Further analysis by microsection and photography revealed that deposition on steel gave coherent porous films and on aluminum yielded coherent non-porous films.

Typical thicknesses obtained by utilization of my technique are shown below:

Substrate: Thickness (inches)
Alcoa 2014 alloy hand forging_____ .0014
Alcoa 380 alloy die casting_____ .00084
Alcoa 6063 alloy extrusion_____ .0023
Alcoa 6061 alloy extrusion_____ .00089
Steel bolt_____ .005

Coatings deposited by my process are free of atmospheric contamination and can be protected after removal from a bath by utilizing a paraffin wax solvent or allowing to cool with the bath. The aluminum deposited by this process is extremely active, probably active enough to serve as a catalytic surface. This is demonstrated by its reactivity toward air and moisture, if not protected. The chemical nature of the aluminum film can be varied by the addition of small quantities of modifiers to the solvent used. Therefore, small amounts of impurities may be purposely added or the entire aluminum film may be converted to an aluminum derivative, as, for example, to an aluminum oxide or sulfide by the addition of an oxidizing agent or a mercaptan, respectively. None of the systems reported heretofore has the flexibility for producing the above variations and any attempt to do so is met with insurmountable technical problems and economic problems.

Because of the chemically pure and active nature of the deposited film (absence of aluminum oxide surface), this film can be used as an intermediate coating upon which other metals such as copper, nickel or chromium may be deposited by electrodeposition, vacuum deposition, or other conventional means. The use of the aluminum film or coating as an intermediate may serve to improve adhesion of an outermost layer of metal, prevent diffusion of outermost layers of metal into the base metal, and provide greater corrosion resistance.

Aluminum films, produced by my process, have also been successfully anodized as indicated in Example Number 14.

The following examples illustrate the novel processes and compositions of the present invention: (ALB refers to aluminum tri-isobutyl).

*Comparative Example A*

A sealed glass vial containing a small quantity of ALB was heated slowly until its temperature was about 200° C. Little or no decomposition to form Al was noted. The temperature was raised to 225° C. and held there for five minutes. A bright aluminum film .001 inch in thickness formed on the sides of the glass vial. The vial is sealed since contact with air causes copious fuming or flames.

*Example 1*

An open vial containing a fifty percent by volume solution of ALB in paraffin was heated to 170–180° C. A powdery deposit of Al was noted. As the temperature of the solution was raised to 230–250° C. a powdery film continued to be deposited. This film differed in continuity and appearance from that formed in Comparative Example A.

*Comparative Example B*

Following the procedure of Comparative Example A, a sample of triethyl aluminum in a closed system was raised to 275° C. and a steel nail heated to 350° C. was immersed therein. A coating of aluminum was formed thereon. It was necessary to go to these temperatures in order to get an appreciable deposition of aluminum.

*Example 2*

A fifty percent by volume solution of triethyl aluminum in paraffin was heated to 255° C. and a steel nail heated to 335° C. was immersed therein. A coating of aluminum was formed about .001 inch in thickness. The reaction was performed in an open vessel.

*Example 3*

A fifty percent by volume solution of ALB in paraffin wax was heated to 170° C. and a brass washer heated to 250° C. was immersed therein. A dull grey aluminum coat of about .0005 inch in thickness was formed.

*Example 4*

The same procedure was followed as in Example 3 except that paraffin distillate was used as a solvent. An aluminum coat of about .0005 inch in thickness was formed.

*Example 5*

The same procedure was followed as in Example 3 except that petrolatum (Vaseline) was used as a solvent.

An aluminum coating (about .0005 inch in thickness) was formed.

Example 6

The same procedure as Example 3 was followed except that a steel washer was heated to 250° C. and the ALB-paraffin wax was heated to 195° C. A dull grey aluminum deposit of about .001 inch in thickness resulted. The deposit was porous.

Example 7

The same procedure as in Example 3 was followed except that the ALB in paraffin wax was at 200° C. A piece of glass one inch by one-half inch by .010 inch was heated to 250° C. and inserted into the ALB solution. A shiny aluminum coating appeared on the glass. This coating is less continuous than the coating of Comparative Example A.

Example 8

The same procedure was followed as in Example 7 except that copper wire was heated to 225° C. and dropped into a ALB–paraffin wax solution at 170° C. No aluminum deposit was observed.

Example 9

The same procedure was followed as in Example 7 except that one-half inch by one-half inch by one-half inch of Norton porous ceramic was heated to greater than 300° C. and dropped into the ALB solution. No aluminum deposit resulted.

Example 10

A thirty-five percent by volume solution of ALB in petrolatum (Vaseline) was heated to 205° C. and a steel nail at 275° C. inserted therein. A dull grey coating of Al resulted. The film appeared discontinuous and was about 0.0002 inch in thickness.

Example 11

A seventy-five percent by volume solution of ALB in paraffin wax was heated to 190° C. and a piece of glass one inch by one-half inch by .010 inch heated to 235° C. was inserted into the solution. A bright aluminum deposit about .0005 inch in thickness was formed. The aluminum coating proved to be electrically conductive.

Example 12

A twenty-five percent by volume solution of triethyl aluminum in paraffin distillate was heated to 300° C. and a steel bolt heated to 350° C. was inserted therein. A dull grey coat was formed, about .0001 inch in thickness. The film was porous but reasonably coherent.

Example 13

A fifty percent by volume solution of ALB in paraffin wax was poured into a cylindrical mold and allowed to cool to room temperature. The pencil like "soldering stick" was drawn across a piece of steel shim which had been previously heated to 300° C. A streak of aluminum formed where the "soldering stick" touched the steel shim. If nitrogen is directed at the "soldering" area, a permanent aluminum film is formed upon cooling. If no inert atmosphere is provided, the hot aluminum film oxidizes to aluminum oxide. This type ($Al_2O_3$) of film is desirable for some applications.

Example 14

The same procedure as Example 3 was followed with a piece of Alcoa 2014 Alloy. After the sample was washed with heptane, it was subjected to anodic coating in dilute sulfuric acid electrolyte under standard operating conditions. The sample developed normal current density and yielded a dark anodic coating. This system can be used for producing anodic coatings for protective and decorative purposes.

Example 15

The same procedure as Example 3 was followed with a piece of steel shim. After cooling to ambient temperature, the sample was cleaned with heptane and immersed in a chromium electroplating bath and chromium plated thereon.

Example 16

The same procedure as Example 15 was conducted except that a nickel electroplating bath was used to plate a thin deposit of nickel thereon.

Example 17

The same procedure as Example 3 was followed except that two percent lithium aluminum hydride was placed in the paraffin wax before the sample was immersed. An analysis of the deposited aluminum film indicated that traces of dissolved hydrogen were present.

Example 18

The same procedure as Example 17 was used except that one percent peracetic acid was placed in the paraffin wax. An analysis of the deposited aluminum film indicates that some aluminum oxide was dispersed therein.

Example 19

The same procedure is used as in Example 17 except that calcium phenyl stearate was added in 0.5 percent quantity to the solvent. On testing the adhesion of the aluminum to washer, it was superior as determined by a tape peel test when compared to the sample obtained in Example 3. It should be noted that better adhesion has been observed in all cases when sanding, degreasing and etching procedures are utilized prior to plating.

In conducting the general process of this invention, the surface to be coated must be of sufficiently high temperature to raise that portion of the bath, which comes into direct contact with the surface, above 175° C. for ALB, 260° C. for aluminum triethyl and 450° C. for aluminum trimethyl, all of which are dissolved in a fifty percent by volume solution in paraffin wax. To do this, when these solutions have been preheated to a temperature slightly below the heat decomposition range of the aluminum alkyls, respectively, the substrate or surface must be heated to a minimum of 225° C. for ALB, 310° C. for aluminum triethyl, and 475° C. for aluminum trimethyl, respectively. It can be concluded from my results that using various solvents will result in a variance of the decomposition point of the aluminum alkyls. In addition, the variation of concentration of the aluminum alkyls in various solvents, both liquid and solid, will affect the continuity, porosity, and thickness of the film deposited. This has enabled me to produce aluminum coatings having accurately controlled characteristics.

As the concentration of the heat decomposable compound is lowered the distance between successively decomposing molecules is lengthened and less overlapping of deposited aluminum atoms is likely to occur. Accordingly, the film is less continuous and greater gaps will also result, yielding increased porosity. Since fewer molecules are in a given heated volume, fewer will be deposited and a thinner film will result. Inversely, increased concentration will result in greater continuity and thickness.

Moreover, I have observed that blends of the above three aluminum alkyl solutions give a composite which would allow deposition of aluminum coatings over a wide range, e.g. about 175 through 500 degrees centigrade. This deposition is accomplished by using the above three aluminum alkyls dissolved in paraffin distillate, paraffin wax, Vaseline or other suitable solvents such as higher alkanes and aromatics.

A particular advantage of using solvent systems is that the aluminum alkyls are more safety handled in solution and engineering problems for production equipment are simpler. Another important advantage is that upon removal from the "plating" bath and cooling a protective solvent coat (solid paraffin wax) can be utilized, if desired, that remains and protects the aluminum plated substrate against oxidation, for example.

At the point of decomposition, that portion of the bath decomposes which has reached the decomposition temperature and deposits aluminum on the surface. From the examples, it can be seen that the exact temperature of the surface may be varied in causing deposition of the aluminum coating, so long as it is somewhat above the decomposition temperature of the aluminum compound in solution.

It should be noted that coating occurs as a function of the different type of substrates utilized. For instance, it is noted that predominantly porous aluminum films are deposited on steel (Example 15) and nonporous films on aluminum and its alloys (Example 14). No deposition occurred on high chrome steel ball bearings until the surface was abraded severely. The preceding represents the effect of the chemical and physical nature of the surface on deposition. On the contrary, it is also noted that deposition did not occur on copper wire in an ALB solution in paraffin wax (Example 8). This is because of the heat transfer characteristics of the sample i.e., it lost heat too rapidly before immersion in the "plating" solution and did not cause the surrounding aluminum alkyl to attain the proper temperature for effective decomposition. These materials could be plated if they were heated higher or if the bath temperatures were raised. Effective temperature ranges of aluminum alkyls in solvents will vary as a function of concentration and the use of solvent as indicated in the preceding examples, number Comparative Example A, 1, Comparative Example B, 2 and 10. Substrates to be inserted into the three forementioned aluminum alkyl solutions should be heated to the 225°–275° C., 310–360° C., and 475–525° C., respectively.

Although decomposition of ALB, aluminum triethyl, and aluminum trimethyl starts at 90° C., 150° C. and 250° C., respectively, the initial decomposition products are thought to be aluminum alkyl hydrides and these then must be decomposed to produce aluminum. The result of having a substrate decompose at too high a temperature however, was observed in Example 9. The sample was so hot that the aluminum alkyl decomposed too far from the surface of the ceramic thus providing only a fine powdery Al in the bath itself and not on the surface of the ceramic.

After the initial flash of aluminum, the coating of aluminum may be thickened by leaving the object in the bath for an additional length of time. However, the substrate must be sufficiently hot so that its outermost surface, which is now aluminum, is also above the decomposition temperature of that portion of the bath with which it now comes into contact. The thickening of the coating will stop either at the point that the object is removed from the bath or at the point where the outermost surface (which is now aluminum) drops below the decomposition temperature of the bath.

In some cases, it may prove of value to thicken coats of deposited aluminum since deposition of aluminum on aluminum by my process produces non-porous films which are more corrosion resistant than the initial films deposited on non-aluminum substrates.

The object to be coated is usually dipped into the bath. However, the bath may be placed upon the object, such as by spraying or by painting the surface with the bath. In addition, the "soldering" approach of Example 13 has been used frequently.

The bath itself is pre-heated to a point slightly below its decomposition temperature. For example, a typical plating bath may be preheated to about 170° C. Thus, the surface to be coated need be raised only slightly above the temperature of decomposition of the bath since the surface has only to raise that portion of the bath with which it comes into contact a few degrees (i.e. about 25 degrees centigrade) to cause decomposition and deposition of aluminum thereon.

As can be seen, another advantage of this process for coating surfaces is that the surfaces need be heated only to a relatively low temperature and the process takes place very quickly with a relatively inexpensive bath.

Although it is desirable to carry out the coating process in an inert atmosphere, that is, an atmosphere containing no oxygen, no carbon dioxide, and particularly no moisture, the method is operative under atmospheric conditions, but a more chemically pure coating is obtained in an inert atmosphere.

Another advantage of an inert atmosphere is that in most cases, the coated substrate was allowed to cool within the bath, since exposure while hot, to the atmosphere follows the course of Example 13 wherein the aluminum coating was converted immediately to aluminum oxide. In an inert atmosphere the substrate could be removed from the bath while hot, without harming the aluminum coating.

It is observed therefore that my invention provides a simple, economic method for producing pure or modified films of aluminum (Examples 12 and 18). In addition, "soldering" sticks for providing electrical connections have been produced (Example 13), non-electrical conductors have been made conductive (Example 11), and decorative aluminum films have been produced (Example 11). Corrosion resistance and superior gloss and hardness can be provided by the use of the deposited aluminum film to protect steel (Example 2) and its use as an intermediate coating for electroplating (Examples 15 and 16). Finally, catalytic aluminum surfaces can be formed (Example 5).

This invention may be further developed within the scope of the following appended claims. Accordingly, it is desired that the foregoing description be read as being merely illustrative of an operative embodiment of this invention and not in a strictly limiting sense.

This application is a continuation-in-part of application Serial Number 730,809, filed April 25, 1958 for "Method for Coating Surfaces With Aluminum" now abandoned.

Having fully described the method herein, I now claim:

1. A process for the deposition in solvent medium of aluminum on a surface which comprises: placing an aluminum alkyl compound, capable of decomposing under heat to liberate aluminum, in a hydrocarbon solvent for said compound, said solvent being stable at and boils at temperatures greater than the heat decomposition temperature of said compound; heating the resulting solution to a temperature slightly below the heat decomposition temperature range of said compound in said solvent and heating the said surface to a temperature above about the heat decomposition temperature of said compound; and contacting the said heated solution with said heated surface.

2. The process of claim 1 wherein said compound contains an oxidizing agent.

3. The process of claim 1 wherein said compound contains a reducing agent.

4. The process of claim 1 wherein said compound contains a wetting agent.

5. A process for the deposition in solvent medium of aluminum on a surface which comprises: placing an aluminum alkyl compound, capable of decomposing under heat to liberate aluminum, in paraffin wax solvent for said compound; heating the resulting solution to a temperature slightly below the heat decomposition temperature range of said compound in said solvent and heating the said surface to a temperature above about the heat decomposition temperature of said compound; and contacting the said heated solution with said heated surface.

6. A process for the decomposition in solvent medium of aluminum on a surface which comprises: placing an aluminum alkyl compound, capable of decomposing under heat to liberate aluminum, in a hydrocarbon solvent for said compound, said hydrocarbon solvent being selected from the group consisting of alkanes, aromatics, and paraffins; heating the resulting solution to a temperature slightly below the heat decomposition temperature range of said compound in said solvent and heating the said surface to a temperature above about the heat decomposition temperature of said compound; and contacting the said heated solution with said heated surface.

7. The process for the deposition in solvent medium of aluminum on a surface which comprises: placing an aluminum alkyl compound selected from the group consisting of aluminum tri-methyl, tri-ethyl and tri-isobutyl in a paraffin solvent for said compound, said solvent being stable at and boils at temperatures greater than the heat decomposition temperature of said compound; heating the resulting solution to a temperature slightly below the heat decomposition temperature range of said compound in said solvent and heating the said surface to a temperature above about the heat decomposition temperature of said compound; and contacting the said heated solution with said heated surface.

8. A process for the deposition in solvent medium of aluminum on a surface which comprises: placing an aluminum alkyl compound, capable of decomposing under heat to liberate aluminum, in a solid state solvent for said compound; heating the said surface to a temperature above about the heat decomposition temperature of said compound; and contacting the said compound with said heated surface.

9. The process of claim 8 wherein the said solid state solvent is a hydrocarbon that is stable at and boils at temperatures greater than the heat decomposition temperature of said compound.

10. The process of claim 8 wherein the solvent is paraffin wax.

11. The process of claim 8 wherein the solid state solvent is selected from the group consisting of Vaseline, paraffin wax, and a napthalene.

References Cited in the file of this patent

UNITED STATES PATENTS

| | | |
|---|---|---|
| 2,068,557 | Masnou | Jan. 19, 1937 |
| 2,523,461 | Young et al. | Sept. 26, 1950 |
| 2,657,129 | Stern et al. | Oct. 27, 1953 |
| 2,669,598 | Marko et al. | Feb. 16, 1954 |
| 2,763,569 | Bradstreet | Sept. 18, 1956 |
| 2,785,082 | Clough et al. | Mar. 12, 1957 |
| 2,804,397 | Goodman | Aug. 27, 1957 |
| 2,824,828 | Homer et al. | Feb. 25, 1958 |
| 2,847,320 | Bulloff | Aug. 12, 1958 |
| 2,867,546 | MacNevin | Jan. 6, 1959 |